(12) United States Patent
Yao et al.

(10) Patent No.: US 11,055,832 B2
(45) Date of Patent: Jul. 6, 2021

(54) IMAGE BANDING CORRECTION IN HIGH DYNAMIC RANGE IMAGING

(71) Applicant: QUALCOMM Incorporated, San Diego, CA (US)

(72) Inventors: Yihe Yao, San Diego, CA (US); Tao Ma, San Diego, CA (US); Yawen Chi, Taoyuan (TW); Yan-Jing Lei, New Taipei (TW); Lei Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 82 days.

(21) Appl. No.: 16/526,760

(22) Filed: Jul. 30, 2019

(65) Prior Publication Data

US 2021/0035272 A1 Feb. 4, 2021

(51) Int. Cl.
*G06T 5/00* (2006.01)
*H04N 5/235* (2006.01)
(Continued)

(52) U.S. Cl.
CPC ............. *G06T 5/009* (2013.01); *G06T 5/50* (2013.01); *G06T 7/11* (2017.01); *H04N 5/2355* (2013.01);
(Continued)

(58) Field of Classification Search
CPC . G06T 2207/20208; G06T 2207/20221; G06T 2207/20021; G06T 3/0093;
(Continued)

(56) References Cited

U.S. PATENT DOCUMENTS

2010/0157078 A1* 6/2010 Atanassov .............. G06T 5/007
348/222.1
2014/0354859 A1* 12/2014 Noyes .................. H04N 5/2357
348/241
(Continued)

FOREIGN PATENT DOCUMENTS

EP    2146501 A1 *  1/2010  ........... H04N 5/2357

OTHER PUBLICATIONS

U.S. Appl. No. 16/236,147, filed Dec. 28, 2018, first named inventor Yihe Yao. Attached is the official filing receipt.

*Primary Examiner* — Kim Y Vu
*Assistant Examiner* — Francisco A Agra
(74) *Attorney, Agent, or Firm* — Duane Morris LLP

(57) ABSTRACT

Methods, systems, and apparatuses are provide to perform automatic banding correction in captured images. For example, the methods receive from a plurality of sensing elements in a sensor array, first image data captured with a first exposure parameter, and second image data captured with a second exposure parameter. The methods partition first image data and second image data and determine values for each partition. The methods compute banding errors based on the determined values of the partitions for first image data and second image data. The methods also determine a banding error correction to one or more of first image data and second image data based on the banding errors. Further, the methods perform an automatic correction of the banding errors on one or more of first image data and second image based on the banding error correction.

25 Claims, 10 Drawing Sheets

(51) Int. Cl.
    *G06T 5/50*      (2006.01)
    *G06T 7/11*      (2017.01)

(52) U.S. Cl.
    CPC ............... *G06T 2207/20208* (2013.01); *G06T 2207/20221* (2013.01)

(58) Field of Classification Search
    CPC ... G06T 5/009; G06T 5/50; G06T 7/11; G06T 7/20; H04N 5/23232; H04N 5/2355; H04N 5/235
    See application file for complete search history.

(56) References Cited

U.S. PATENT DOCUMENTS

| | | | |
|---|---|---|---|
| 2015/0207975 A1* | 7/2015 | Nguyen | H04N 5/2357 348/228.1 |
| 2016/0021391 A1* | 1/2016 | Su | H04N 19/30 375/240.12 |
| 2017/0213330 A1* | 7/2017 | Pudipeddi | G06T 5/50 |
| 2017/0347126 A1* | 11/2017 | Shoa Hassani Lashdan | H04N 19/192 |
| 2017/0374263 A1* | 12/2017 | Somayaji | H04N 5/2355 |
| 2018/0288311 A1* | 10/2018 | Baghert | H04N 5/23229 |
| 2019/0058823 A1* | 2/2019 | Dewhurst | H04N 5/2355 |

* cited by examiner

IMAGE BANDING CORRECTION IN HIGH DYNAMIC RANGE IMAGING

BACKGROUND

Field of the Disclosure

This disclosure generally relates to optical systems and processes and, more specifically, to correcting banding effects in high dynamic range imaging.

Description of Related Art

Some image capture devices, such as cameras, incorporate high dynamic range (HDR) techniques to capture images with a greater dynamic range of luminosity than is possible with other standard imaging techniques. Environmental conditions, however, may cause errors or defects to appear in captured images.

SUMMARY

Disclosed computer-implemented methods for performing banding correction in image capture devices include receiving, by one or more processors, first and second image data, the first image data being captured with a first exposure parameter, and the second image data being captured with a second exposure parameter. The methods may also include, by the one or more processors, computing first partition values for a first plurality of partitions based on first pixel values corresponding to the first plurality of partitions, and computing second partition values for a second plurality of partitions based on first pixel values corresponding to the second plurality of partitions. The methods may further include computing, by the one or more processors, banding error values based on the first and second partition values. The methods may further include performing, by the one or more processors, a correction operation on the first image data based on the banding error values.

A disclosed device for performing banding correction may include a non-transitory, machine-readable storage medium storing instructions, and at least one processor configured to be coupled to the non-transitory, machine-readable storage medium. The at least one processor may be configured by the instructions to receive first and second image data, the first image data being captured with a first exposure parameter, and the second image data being captured with a second exposure parameter. The at least one processor may be further configured by the instructions to compute first partition values for a first plurality of partitions based on first pixel values corresponding to the first plurality of partitions, and compute second partition values for a second plurality of partitions based on second pixel values corresponding to the second plurality of partitions. The at least one processor may also be configured by the instructions to compute banding error values based on the first and second partition values. The at least one processor may be further configured by the instructions to perform a banding correction operation on the first image data based on the banding error values.

Further, an apparatus for performing image banding correction may include a means for receiving first and second image data, the first image data being captured with a first exposure parameter, and the second image data being captured with a second exposure parameter. The apparatus may further include a means for computing first partition values for a first plurality of partitions based on first pixel values corresponding to the first plurality of partitions, and computing second partition values for a second plurality of partitions based on second pixel values corresponding to the second plurality of partitions. The apparatus may include a means for computing banding error values based on the first and second partition values, and a means for performing a banding correction operation on the first image data based on the banding error values.

A disclosed non-transitory, machine-readable storage medium stores program instructions that, when executed by at least one processor, perform a method for correcting banding errors. The machine-readable storage medium includes instructions for receiving first and second image data, the first image data being captured with a first exposure parameter, and the second image data being captured with a second exposure parameter. The machine-readable storage medium also includes instructions for computing first partition values for a first plurality of partitions based on first pixel values corresponding to the first plurality of partitions, and computing second partition values for a second plurality of partitions based on second pixel values corresponding to the second plurality of partitions. The machine-readable storage medium also includes instructions for computing banding error values based on the first and second partition values, and for performing a banding correction operation on the first image data based on the banding error values.

DETAILED DESCRIPTION

Figure 1:
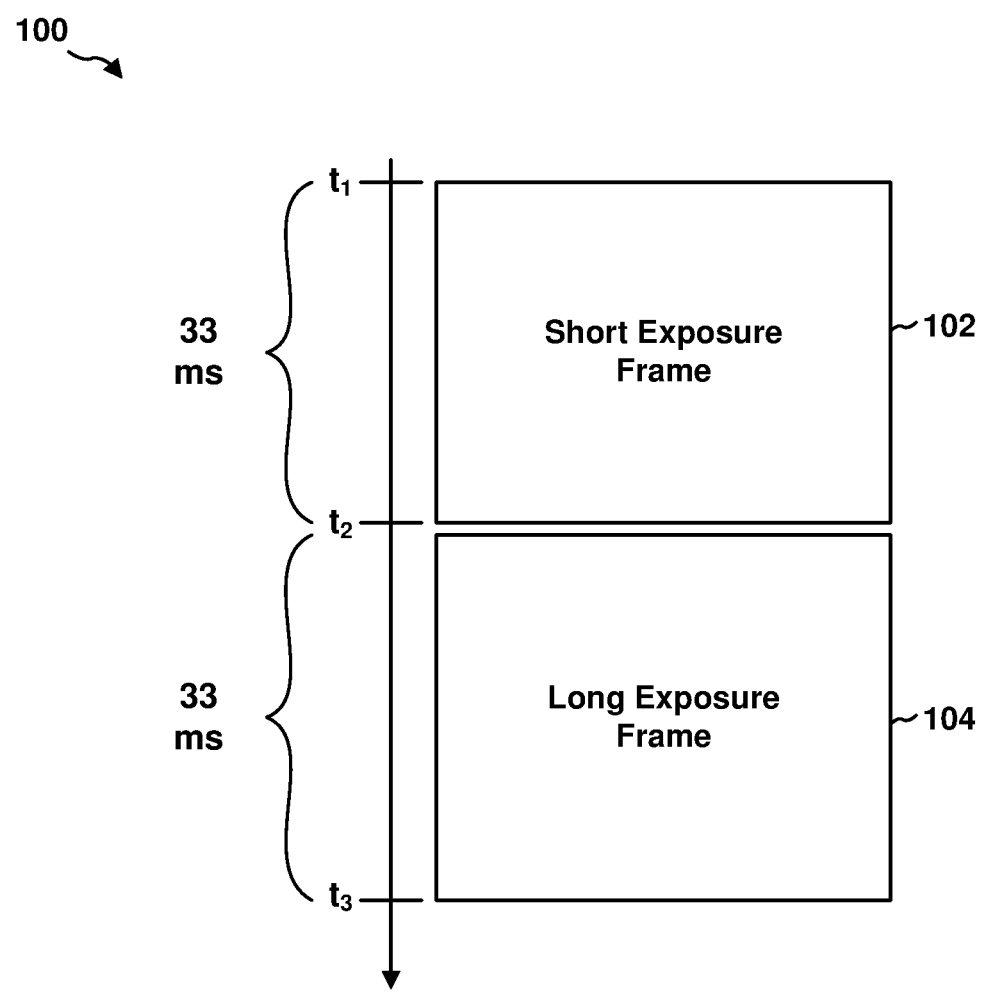
FIGS. 1 and 2 illustrate examples of HDR processing, according to some examples.

While the features, methods, devices, and systems described herein may be embodied in various forms, some exemplary and non-limiting embodiments are shown in the drawings, and are described below. Some of the components described in this disclosure are optional, and some implementations may include additional, different, or fewer components from those expressly described in this disclosure.

Relative terms such as "lower," "upper," "horizontal," "vertical,", "above," "below," "up," "down," "top" and "bottom" as well as derivative thereof (e.g., "horizontally," "downwardly," "upwardly," etc.) refer to the orientation as then described or as shown in the drawing under discussion. Relative terms are provided for the reader's convenience. They do not limit the scope of the claims.

Many imaging devices, such as digital cameras, smartphones, tablet computers, laptop computers, automobiles, or Internet-of-things (IoT) devices (e.g., security cameras, etc.) include imaging assemblies that process captured image data characterizing a target scene using image processing techniques that include, but are not limited to, a high-dynamicrange (HDR) image processing. By way of example, these imaging assemblies may include one or more optical elements, such as an assembly of one or more lenses (e.g., a lens assembly) that focus incident light onto an imaging sensor disposed at a corresponding imaging plane (e.g., an array of sensing elements formed within a semiconductor substrate). The imaging assemblies may also include a shutter that, when open, allows the incident light to reach the sensing elements.

Each of the sensing elements may collect incident light and generate an electrical signal, which characterizes and measures a value of a luminance of the incident light and further, a chrominance of the incident light. For example, each of the sensing elements may include color-filtered photodiodes, e.g., to establish the red, green, and blue (RGB) color channels described below. Each of these imaging devices may also include one or more processors, such as an image signal processor, that convert the generated electrical signals representing luminance and/or chrominance values into corresponding image data characterizing the target scene, which may be stored within one or more non-transitory, machine-readable memories as image data, and which may be processed for presentation on a corresponding display unit. The amount of light collected by the sensing elements may depend on factors that include, but are not limited to, a shutter speed (e.g., the amount of time a shutter is open while capturing an image), a lens aperture, and a scene luminance (e.g., the amount of environmental light captured by the sensing elements).

In some instances, the elements of image data characterizing the target scene may be associated with, and characterized by, corresponding exposure parameters. Examples of these exposure parameters include, but are not limited to, an exposure length (e.g., as established by a difference between corresponding exposure start and finish time), a gain, or another parameter of the imaging assemblies, the sensing elements, or the image signal processor. For instance, the image data may include at least one image captured with a shorter exposure length (e.g., low exposure image), and at least one image captured with a longer exposure length (e.g., long exposure image). Through an application of one or more image processing techniques, such as HDR image processing, the imaging devices may perform operations that combine the multiple frames (e.g., which represent multiple exposures of the target scene) to produce a final image of the target scene.

FIG. 1 illustrates an example of HDR image processing 100 in accordance with some implementations. As mentioned above, some implementations of HDR processing can generate frames with different exposure lengths (e.g., time periods between a start and a completion of the corresponding exposures). These frames with multiple exposure lengths can be generated by an imaging sensor, e.g., the imaging sensors described herein. These frames can also readout from the imaging sensor sequentially, i.e., pixels can be transferred from the sensor to another aspect of the camera. In some aspects, the exposure lengths can be longer than the readout times. In other aspects, the readout times may be longer than the exposure lengths. FIG. 1 shows that frames with two different exposures, short exposure frame 102 and long exposure frame 104, are generated at an imaging sensor. In some aspects, short exposure frame 102 can have an exposure length of 1 ms, while long exposure frame 104 can have an exposure length of 30 ms. As further shown in FIG. 1, HDR image processing 100 may have times $t_1$, $t_2$, and $t_3$, where the time period between $t_1$ and $t_2$ is 33 ms and the time period between $t_2$ and $t_3$ is also 33 ms. Also, the time period between $t_1$ and $t_2$ can be the generation period for short exposure frame 102, while the time period between $t_2$ and $t_3$ can be the generation period for long exposure frame 104. FIG. 1 displays one type of HDR image processing where different frames are generated in sequence, and the different frames are not staggered or overlapped.

Some implementations of the present disclosure can also include other types of HDR processing. For instance, the present disclosure can utilize staggered HDR processing, which is a temporal HDR solution that can provide multiple exposure lengths from a sensor image. Staggered HDR processing can be different from some aspects of the aforementioned multi-frame HDR processing, e.g., the generation period of the two or more exposure frames can be shorter. In some instances, the generation period can be less than a frame exposure length. In other instances, the generation period can be greater than a frame exposure length. As mentioned above, in some aspects of HDR processing, the multiple exposure frames can have a generation period of 33 ms. In staggered HDR processing, the generation period can be shorter, e.g., less than 10 ms.

Figure 2:
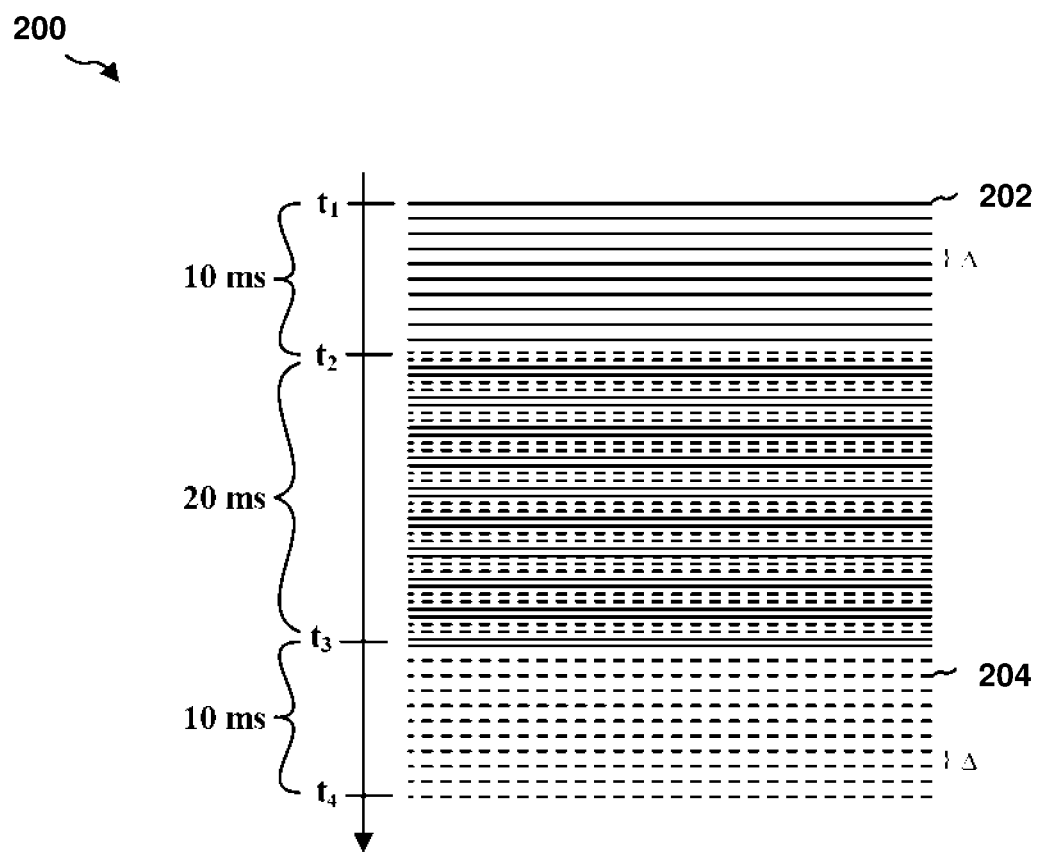

FIG. 2 illustrates another example of HDR image processing 200 in accordance with another implementation. More specifically, HDR image processing 200 is a type of staggered HDR processing. As indicated above, staggered HDR processing can utilize line-based sensor exposures to generate frames. For instance, staggered HDR processing can use different line-based exposures to generate frames with different exposure length. As shown in FIG. 2, HDR image processing 200 can generate multiple frames, where each frame is generated through a line-based exposure at an imaging sensor. For example, short exposure frames can be generated through short exposure lines 202 and long exposure frames can be generated through long exposure lines 204. Also, the multiple frames can have at least two different exposure lengths, e.g., short exposure frames and long exposure frames. As shown in FIG. 2, in some instances, the multiple frames can include one short exposure frame generated through short exposure lines 202 and one long exposure frame generated through long exposure lines 204. Further, the multiple frames can have staggered line-based exposure times during the at least two different exposure length, e.g., short exposure lines 202 and long exposure lines 204 can be staggered during the generation of short exposure frames and long exposure frames.

HDR image processing 200 can use a staggered approach to stagger the different exposure times through a line-based exposure system. For example, HDR image processing 200 can stagger the line-based exposures for frames with different exposure lengths, e.g., short and long exposure frames. In some aspects, the short exposure frames maybe generated with the line-based exposures before the long exposure frames, e.g., short exposure lines 202 may begin before long exposure lines 204. In other aspects, the long exposure frames may be generated with the line-based exposures prior to the short exposure frames, e.g., long exposure lines 204 may begin before short exposure lines 202.

As shown in FIG. 2, HDR image processing 200 includes two different types of line-based exposures: short exposure lines 202 that are indicated with solid black lines and long exposure lines 204 that are indicated with dashed lines. As mentioned above, short exposures frames can be generated with short exposure lines 202 and long exposure frames can be generated with long exposure lines 204. FIG. 2 also displays times $t_1$, $t_2$, $t_3$, and $t_4$. At $t_1$, the first short exposure line 202 can begin generating a short exposure frame. At $t_1$ plus some value A, e.g., 10 μs, another short exposure line 202 can be used to generate the short exposure frame. The time period between each short exposure line 202 can be the value A, e.g., 10 µs. In some aspects, each short exposure frame generated by short exposure lines 202 can have an exposure length of 1 ms. Also, each long exposure frame generated by long exposure lines 904 can have an exposure length of 30 ms.

As shown in FIG. 2, the time period between $t_1$ and $t_2$ can be 10 ms, the time period between $t_2$ and $t_3$ can be 20 ms, and the time period between $t_3$ and $t_4$ can be 10 ms. In some aspects, the time period between $t_1$ and $t_2$ may only include the short exposure lines 202. The time period between $t_2$ and $t_3$ may include both the short exposure lines 202 and the long exposure lines 204. Also, the time period between $t_3$ and $t_4$ may only include the long exposure lines 204. Accordingly, the time period between $t_2$ and $t_3$ may have overlap between the short exposure lines 202 and the long exposure lines 204. As shown in FIG. 2, the overlapping period between $t_2$ and $t_3$ may alternate between short exposure lines 202 and long exposure lines 204, e.g., once every two lines.

At $t_2$, the first long exposure line 204 can begin generating a long exposure frame. As such, in some aspects, the start of the long exposure lines 204 can be delayed from the start of the short exposure lines 202 by a period of 10 ms. As indicated previously, this delay period between different exposure lines can be shorter than other types of HDR processing. Therefore, in some aspects, staggered HDR processing can be more suitable for a faster moving camera, as the long exposure lines are closer to the short exposure lines. At $t_2$ plus some value A, e.g., 10 µs, another long exposure line 204 can be used to generate the long exposure frame. The time period between each long exposure line 204 can be the value A, e.g., 10 µs. At $t_3$, the short exposure lines 202 may stop generating a short exposure frame. Accordingly, the short exposure lines 202 may run from $t_1$ to $t_3$, e.g., 30 ms, so the amount of time to generate a short exposure frame may be 30 ms. As indicated in FIG. 2, the time period between $t_3$ and $t_4$ may only include the long exposure lines 204. As such, the long exposure lines 204 may run from $t_2$ to $t_4$, e.g., 30 ms, so the amount of time to generate a long exposure frame may also be 30 ms. As the amount of time from $t_1$ to $t_4$ is 40 ms, the total amount of time to generate both the short and long exposure frames may be 40 ms. In contrast, other types of HDR processing may take a longer period of time to generate frames. For example, it may take 66 ms to generate both a short and long exposure frame with other types of HDR processing. Thus, at least one benefit of staggered HDR processing can be to reduce the time period that it takes to generate the frames.

As indicated in FIG. 2, a sensor may use a number of short and long exposure lines in order to generate short and long exposure frames. For example, as there are 3,000 occurrences of 10 µs within a time period of 30 ms, HDR processing 900 can utilize 3,000 short exposure lines 202 to generate a short exposure frame, as well as 3,000 long exposure lines 204 to generate a long exposure frame. Accordingly, in some aspects, there can be a total of 6,000 short exposure lines 202 and long exposure lines 204 from $t_1$ to $t_4$.

In some instances, the amount of light captured by an imaging sensor during multiple exposures may vary due to corresponding temporal variations in the corresponding scene luminance. For example, the temporal variation in the scene luminance, or flicker, may result from a fluctuation in a power source of an overhead light, a street lamp, or other source of light illuminating the target scene (e.g., due to variations in the power grid, through electrical dimmers, etc.) or from a temporally varying presence of additional light sources of various brightness within the target scene (e.g., due to movement of a vehicle's headlights, etc.), and a resulting temporal variation in luminance across the multiple frames of the images data may introduce visual defects, such as banding, within the final combined images. In some examples, an imaging device may correct for banding errors or defects within captured image data (e.g., resulting from flicker) based on an application of one or more staggered HDR processing techniques described herein to portions of captured image data characterized by different exposure parameters, such as, but not limited to, difference exposure lengths.

Figure 3:
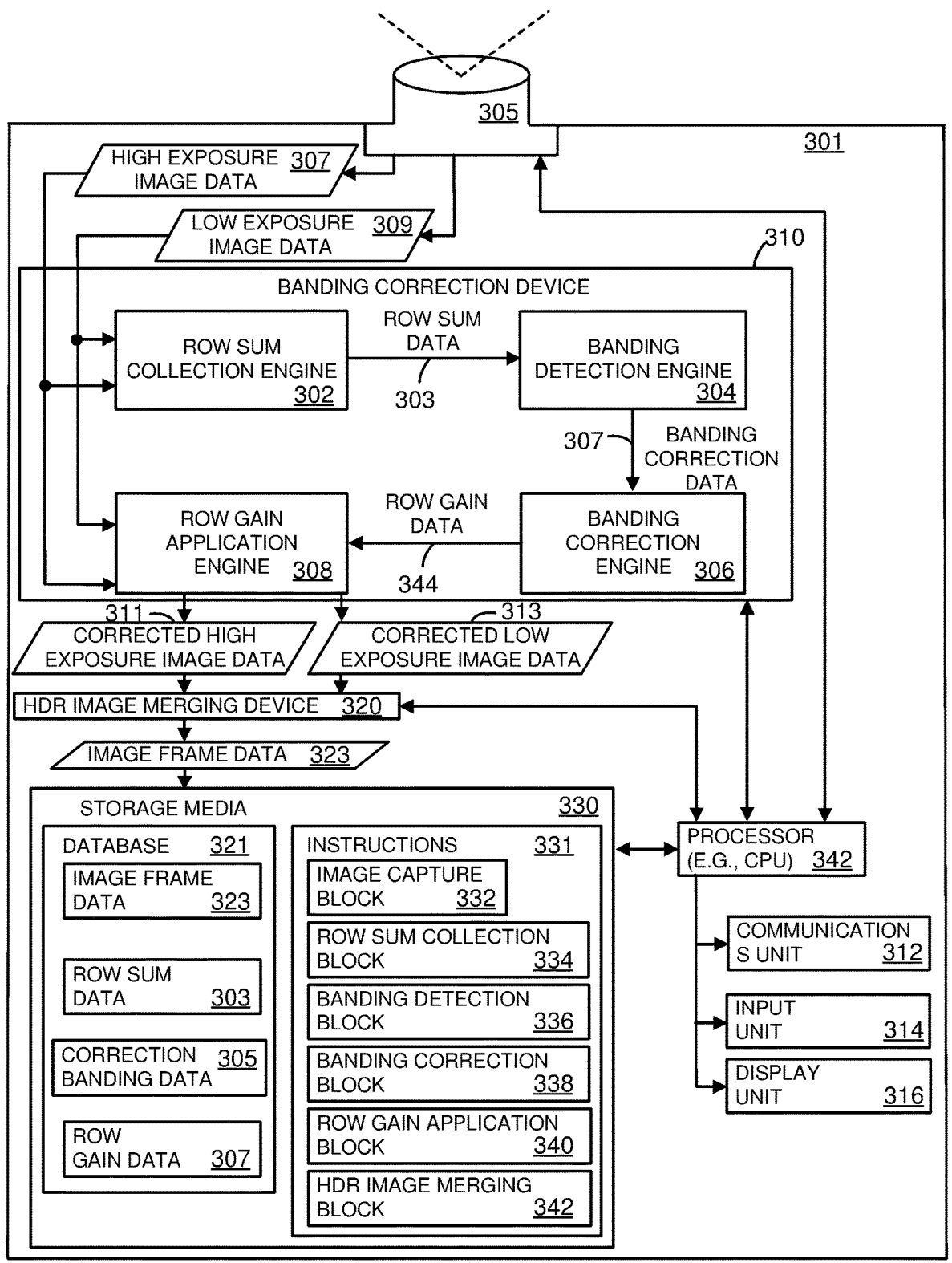
FIG. 3 is a diagram illustrating components of an exemplary image capture device, according to some examples.

FIG. 3 illustrates an example imaging device 301, in accordance with some implementations. As illustrated in FIG. 3, imaging device 305 may include an image sensor 305, a banding correction device 310, an HDR image merging device 320, and a storage media 330. Imaging device 301 may be a staggered HDR camera, for example.

Imaging device 301 may also include one or more processors, one or more field-programmable gate arrays (FPGAs), one or more application-specific integrated circuits (ASICs), one or more state machines, digital circuitry, or any other suitable circuitry. For example, as illustrated in FIG. 3, imaging device 301 may include a processor 342 communicatively coupled to image sensor 305, banding correction device 310, HDR image merging device 320, and storage media 330. In some instances, banding correction device 310 and HDR image merging device 320 may be implemented as software, e.g., via instructions maintained within storage media 330 and executed by processor 342, or as elements of processor-based hardware coupled to processor 342.

In some instances, image sensor 305 may capture images of a scene at varying exposure length. For example, image sensor 305 may capture a high exposure image of the scene, and provide high exposure image data 307 characterizing the captured high exposure image. Image sensor 305 may also capture a low exposure image of the scene, and provide low exposure image data 309 characterizing the low exposure image. Image sensor 305 may capture the high exposure image and low exposure images of the scene based on HDR image processing 100 or HDR image processing 200, for example. A "high exposure image" represents an image captured with an exposure length that exceeds an additional exposure length of an additional captured image (i.e., a "low exposure image"). For example, the exposure length of a high exposure image is greater than the exposure length of a low exposure image. In some examples, image sensor 305 may capture additional images, such as three or four images, at varying exposure levels. Each of high exposure image data 307 and low exposure image data 309 may include red, green, and blue color components, and may identify and characterize corresponding pixel values.

Banding correction device 310 is operable to receive high exposure image data 307 and low exposure image data 309 from image sensor 305, and to apply a correction to one or more of high exposure image data 307 and low exposure image data 309, e.g., to reduce or avoid banding errors in a final image output by imaging device 301. In some examples, banding correction device 310 may apply a correction to high exposure image data 307, and may generate and output corrected high exposure image data 311 characterizing a version of the captured high exposure image corrected for banding errors. Banding correction device 310 may also apply a correction to low exposure image data 309, and may generate and output corrected low exposure image data 313 characterizing a version of the low exposure image corrected for banding errors. Each of corrected high exposure image data 311 and corrected low exposure image data 313 may include red, green, and blue color components, and may include corresponding pixel values (e.g., corrected pixel values).

In some examples, banding correction device 310 may apply the correction to a selected one of high exposure image data 307 or low exposure image data 309. For instance, banding correction device 310 may apply a correction to low exposure image data 309, and output corrected low exposure image data 313 in conjunction with uncorrected high exposure image data 307, e.g., instead of corrected high exposure image data 311. Further, in some examples, banding correction device 310 may receive additional low and high exposure image data characterizing additional images of a scene, e.g., as captured by image sensor 305, and generate and output at least one of corrected high exposure image data 311 or corrected low exposure image data 313 for one or more of these additional images.

Imaging device 301 also includes HDR image merging device 320, which may perform operations that merge (e.g., combine) corrected high exposure image data 311 and corrected low exposure image data 313 and render a final image characterized by image frame data 323. In some examples, HDR image merging device 320 may merge together elements of corrected or uncorrected high and low exposure image data output by banding correction device 310 for any number of images captured by image device 301. HDR image merging device 320 may store image frame data 323 in a non-transitory, machine-readable storage medium, such as storage media 330.

Storage media 330 may include a database 321 and instructions 331 stored thereon. Processor 342 may execute instructions 331, and may store data to, and retrieve data from, database 321. In some examples, processor 342 retrieves instructions 331 from storage media 330, and provides instructions 331 to banding correction device 310 for execution. Processor 342 may also receive data from banding correction device 310 (e.g., corrected high exposure image data 311, corrected low exposure mage data 313, etc.), and store the data within database 321.

Processor 342 may also be coupled to a communications unit 312, to one or more input units or devices, such as input unit 314, and to display unit 316. In some instances, communications unit 312 facilitates communications between imaging device 301 and one or more network-connected computing systems or devices across a communications network using any suitable communications protocol. Examples of these communications protocols include, but are not limited to, cellular communication protocols such as code-division multiple access (CDMA®), Global System for Mobile Communication (GSM®), or Wideband Code Division Multiple Access (WCDMA®) and/or wireless local area network protocols such as IEEE 802.11 (WiFi®) or Worldwide Interoperability tier Microwave Access (WiMAX®).

Input unit 314 may, in some instances, be configured to receive input from a user of imaging device 301. Examples of input unit 314 include, but are not limited to, one or more physical buttons, keyboards, controllers, microphones, pointing devices, and/or pressure-sensitive surfaces. Display unit 316 may include, but is not limited to, an LED display screen or a pressure-sensitive touchscreen display unit. Further, in some instances, input unit 314 and display unit 316 may be incorporated into a single element of hardware, such as the pressure-sensitive touchscreen display unit.

By way of example, processor 342 may include one or more distinct processors, each having one or more cores. Each of the distinct processors may have the same structure or respectively different structures. Processor 342 may also include one or more central processing units (CPUs), one or more graphics processing units (GPUs), application specific integrated circuits (ASICs), digital signal processors (DSPs), or combinations thereof. If processor 342 were a general-purpose processor, processor 342 may be "configured to" by instructions 331 to serve as a special-purpose processor and perform one or more certain functions or operations. Further, in some examples, and upon execution of instructions 331, processor 342 performs any of the banding correction processes described herein, such as those performed by banding correction device 310, and any of the image merging processes described herein, such as those performed by staggered HDR banding merging device 320.

Database 321 may include structured or unstructured data records storing data that includes, but is not limited to, image frame data 323, row sum data 303, banding correction data 307, and row gain data 344. By way of example, image frame data 323 may include data characterizing one or more images provided by HDR image merging device 320. Further, and as described herein, image frame data 323 may include, but is not limited to, data specifying values of luminance, chrominance, and/or color components (e.g., red, blue, and green color component values) as captured by image sensor 305, corrected for banding errors by banding correction device 310, and merged or combined together by HDR image merging device 320.

Further, as illustrated in FIG. 3, banding correction device 310 includes row sum collection engine 302, banding detection engine 304, banding correction engine 306, and row gain application engine 308. In some examples, one or more of row sum collection engine 302, banding detection engine 304, banding correction engine 306, and row gain application engine 308 may be implemented in hardware, such as in an FPGA, in an ASIC, or in an image signal processing (ISP) chip. In some examples, one or more of row sum collection engine 302, banding detection engine 304, banding correction engine 306, and row gain application engine 308 may be implemented as an executable program maintained in a tangible, non-transitory memory, such as instructions 331 in storage media 330 that may be executed by processor 342. In some examples, one or more of row sum collection engine 302, banding detection engine 304, banding correction engine 306, and row gain application engine 308 may be implemented in elements of processor-based hardware coupled to the one or more processors.

Row sum collection engine 302 may receive, from image sensor 305, high exposure image data 307 and low exposure image data 309, which characterize high exposure and low exposure images, respectively, captured by image sensor 305 for a scene. In some examples, row sum collection engine 302 receives additional images at varying exposures from image sensor 305. For example, row sum collection engine 302 may receive three images captured at various exposure levels for a scene, such as a low exposure image, a medium exposure image, and a high exposure image. Each exposure image, including high exposure image data 307 and low exposure image data 309, may include red, green, and blue color components.

Row sum collection engine 302 may generate row sum data 303 characterizing row sum values for each of high exposure image data 307 and low exposure image data 309. The row sum values may be based on pixel values corresponding to portions of each of high exposure image data 307 and low exposure image data 309. In some examples, the row sum values may be generated by adding (e.g., summing) the pixel values of the corresponding portions of each of high exposure image data 307 and low exposure image data 309.

For example, row sum collection engine 302 may identify discrete portions of each of high exposure image data 307 and low exposure image data 309, which include subsets of the pixel values include within respective ones of high exposure image data 307 and low exposure image data 309. In some examples, row sum collection engine 302 partitions each of high exposure image data 307 and low exposure image data 309 into columns (e.g., an equal number of columns) that include an equivalent (or nearly equivalent) number of pixel values. For example, assuming an image size of 1920 pixels by 1080 pixels (e.g., 1920 columns of pixels (width), and 1080 rows of pixels (height), excluding blanking pixels), row sum collection engine 302 may partition each of high exposure image data 307 and low exposure image data 309 into a predefined or dynamically determined number of partitions (e.g., columns). In some examples, the number of partitions is programmable by a user, such as by providing the number to imaging device 301 via input unit 316, or may be determined dynamically by row sum collection engine 302. For each row of each partition, row sum collection engine 302 may generate a corresponding row sum value based on a summation of the pixel values corresponding to each row of each partition.

Figure 4A:
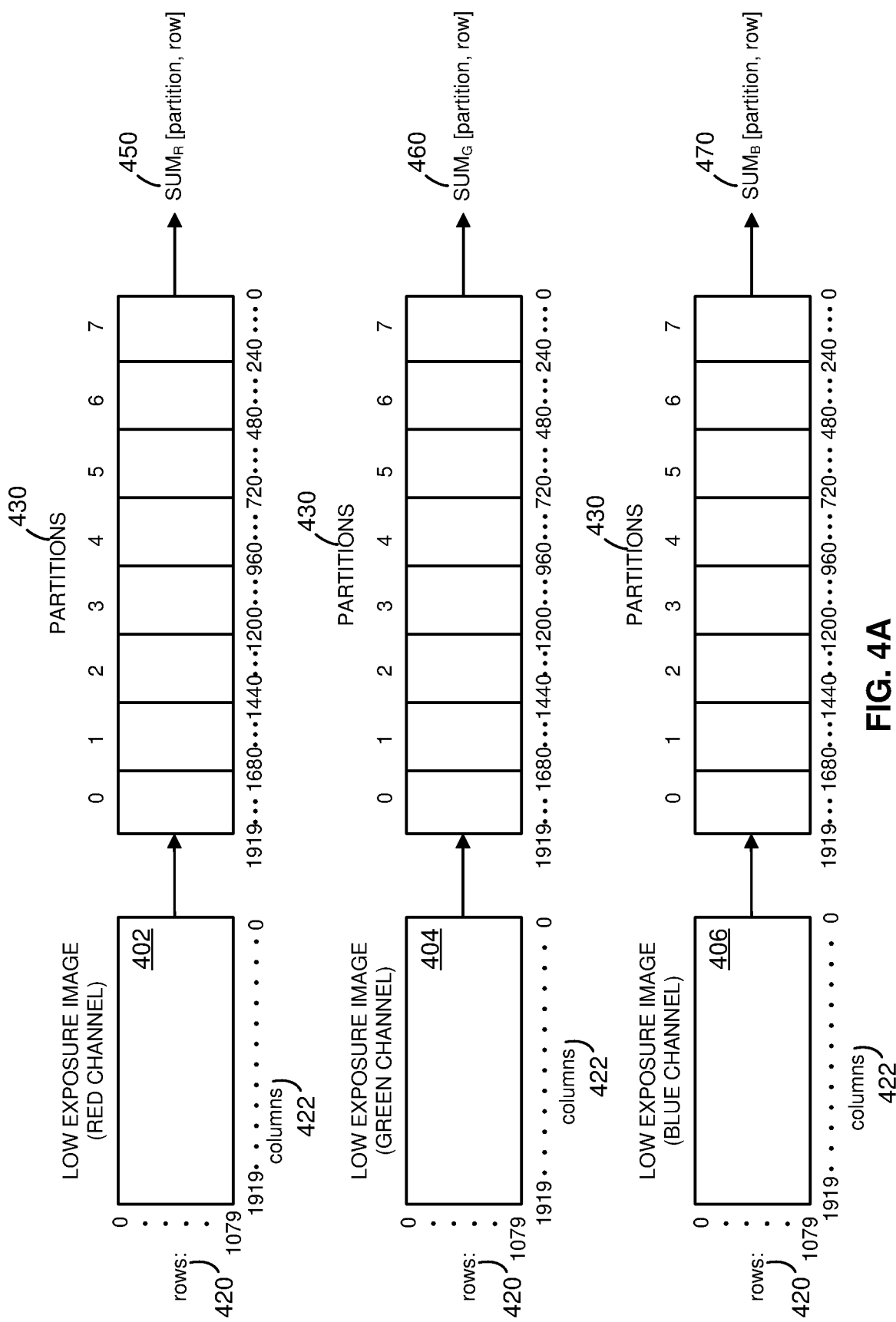
FIGS. 4A and 4B are diagrams illustrating the partitioning of images, according to some examples.

For example, row sum collection engine 302 may partition each of high exposure image data 307 and low exposure image data 309 into eight equal partitions, and each partition will include 1080 rows of 240 pixels (e.g., 1920/8). FIG. 4A illustrates a low exposure image 402, 404, 406 (which may be one characterized by low exposure image data 309) for a red, green, and blue channel. As illustrated in FIG. 4A, each low exposure image 402, 404, 406 includes pixel rows 420, referenced as pixel rows 0 through 1079. Each low exposure image 402, 404, 406 also includes pixel columns 422 referenced as pixel columns 0 through 1919. Row sum collection engine 302 may partition each low exposure image into eight equal partitions 430. For example, partition 0 may include pixel columns 1919 through 1680; partition 1 may include pixel columns 1679 through 1440; partition 2 may include pixel columns 1439 through 1200; partition 3 may include pixel columns 1199 through 960; partition 4 may include pixel columns 959 through 720; partition 5 may include pixel columns 719 through 480; partition 6 may include pixel columns 479 through 240; and partition 7 may include pixel columns 230 through 0.

Row sum collection engine 302 may then generate row sum values for each row of each partition based on the pixel values corresponding to the row and partition. For example, and with reference to the red channel low exposure image 402 of FIG. 4A, row sum collection engine 302 may add pixel values for each row of partition 0 to generate row sum values for column 0. Row sum collection engine 302 may generate a vector, such as vector $SUM_R$ [partition, row] 450 (e.g., $SUM_R$ [8][1080] in this example), that identifies the row sum values. For example, row sum collection engine 302 may add the pixel values corresponding to partition 0, row zero (i.e., pixel values corresponding to pixel row zero, pixel columns 1919 through 1680), and store the result in vector element $SUM_R$[0][0].

Similarly, row sum collection engine 302 may generate a row sum value for each row of each partition of the low exposure image 404 for the green channel, and generate vector $SUM_G$ [partition, row] 460 that identifies the row sum values. Row sum collection engine 302 may also generate a row sum value for each row of each partition for the low exposure image 406 of the blue channel, and generate vector $SUM_B$ [partition, row] 470 that identifies the row sum values. Row sum collection engine 302 may store data identifying and characterizing the row sum values (e.g., for each of the red, green, and blue channels) as a portion of row sum data 303 in database 321, for example.

Figure 4B:
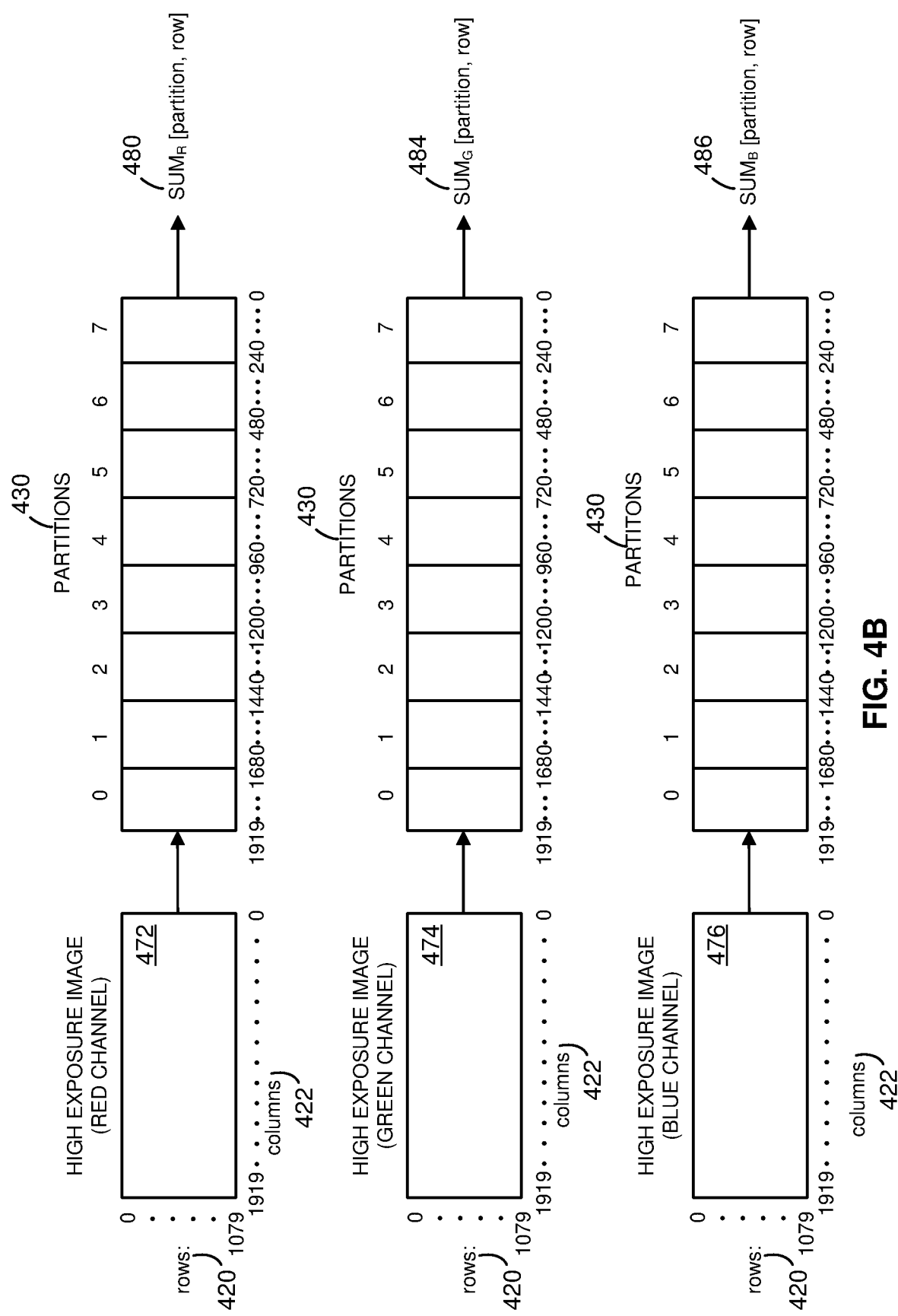

Similarly, row sum collection engine 302 may partition high exposure image data 307, and generate row sum values for each row of each partition. For example, FIG. 4B illustrates the partitioning of a long exposure image 472, 474, 476 that also includes 1920 by 1080 pixels in a red, green, and blue channel. Similar to the low exposure image 402, 404, 406 of FIG. 4A, row sum collection engine 302 may partition each long exposure image 472, 474, 476 of each channel into eight partitions 430, and generate row sum values identified by vector $SUM_R$ [partition, row] 480, vector $SUM_G$ [partition, row] 484, and vector $SUM_B$ [partition, row] 486, respectively. Row sum collection engine 302 may store data identifying and characterizing the additional row sum values (e.g., for each of the red, green, and blue channels of high exposure image data 307) as an additional portion of row sum data 303 in database 321, for example.

In some examples, row sum collection engine 302 may down-sample the resultant row sum values prior to storage within database 321, e.g., as row sum data 303. For example, row sum collection engine 302 may down-sample each vector SUM by four, or by any other amount. In the example where each vector SUM identifies 8 partitions, with 1080 pixel values for each partition, row sum collection engine 302 may down-sample each vector SUM to identify 270 (i.e., 1080/4) pixel values. In these examples, row sum data 303 identifies and characterizes the down-sampled row sum values. By down-sampling, row sum collection engine 302 may reduce further processing time and/or power.

In some examples, row sum collection engine 302 may also down-sample one or more of high exposure image data 307 and low exposure image data 309 before partitioning and generation of the corresponding row sum values. As an example, and as described herein, each of high exposure image data 307 and low exposure image data 309 may include image sizes of 1920 pixels by 1080 pixels, and row sum collection engine 302 may down-sample the rows of each of the images (e.g., the 1080 rows) by, for example, a factor of four. The resulting images may include down-sampled images characterized by images that are each 1920 pixel columns by 270 pixel rows. Row sum collection engine 302 may then partition each of the down-sampled portions of "high exposure image data 307 and low exposure image data 309, and generate row sum values for each partition identified and characterized by row sum data 303, as described above.

Figure 5:
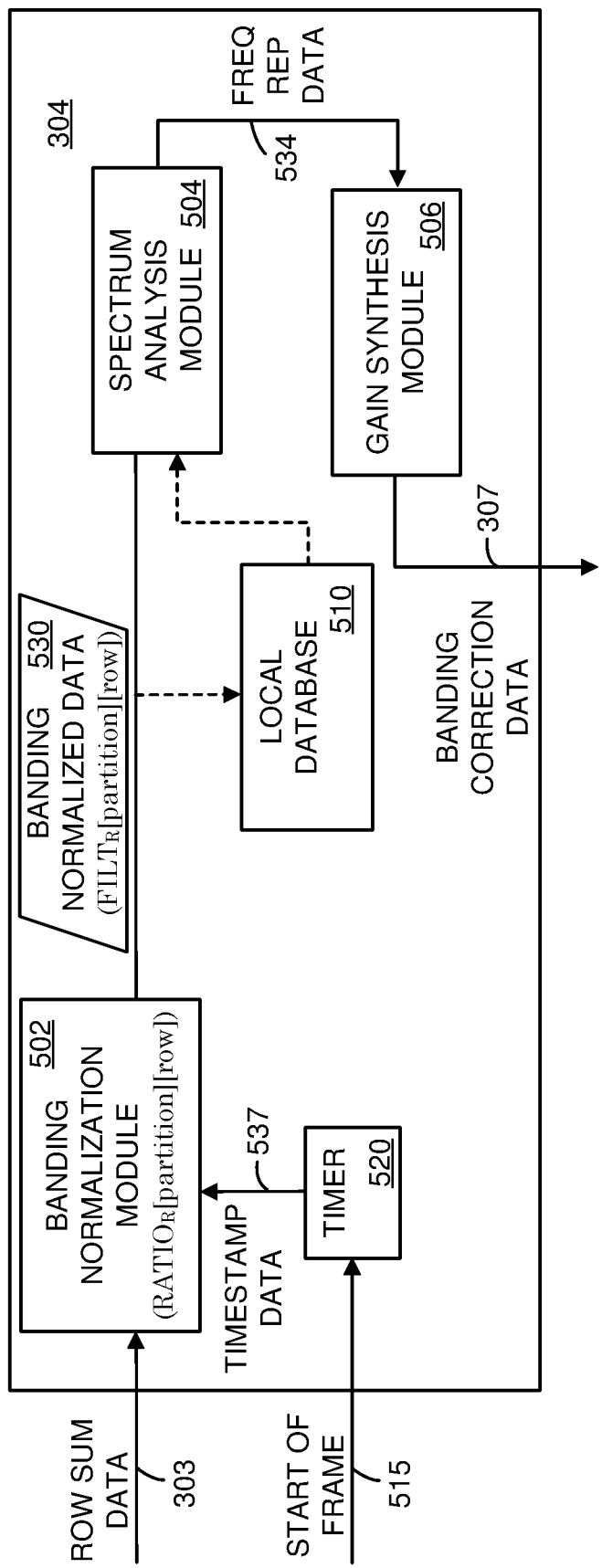
FIG. 5 is a diagram illustrating components of an exemplary image capture device, according to some examples.

Referring back to FIG. 3, banding detection engine 304 may receive row sum data 303 from row sum collection engine 302, and generate banding correction data 307 that identifies and characterizes banding errors in the row sum values identified by row sum data 303. FIG. 5 illustrates a more detailed view of banding detection engine 304, and is described in more detail further below. As illustrated in FIG. 5, banding detection engine 304 may include banding normalization module 502, spectrum analysis module 504, gain synthesis module 506, and timer 520, one or more of which may be implemented as software, e.g., via instructions executed by processor 342 of imaging device 301, or as elements of processor-based hardware coupled to processor 342 of imaging device 301.

As described herein, the row sum values identified by row sum data 303 may include banding errors. Banding errors may be caused by, for example, the illuminance of a captured scene, and by other factors, such as the sensitivity of a camera system (e.g., imaging device 301) and a color and light reflectance properties within the captured scene. Environmental conditions, such as a harmonic power supply, may also cause errors in captured illuminance, which may result in banding errors to appear in final images. Because long exposure images may include exposure times that are multiple times that of the half-period of a power supply, long exposure images are as susceptible to power supplies or other environmental frequencies as are low exposure images or even medium exposure images.

In some examples, banding detection engine 304 may normalize all or selected portions of row sum data 303 to remove, from row sum data 303, banding effects from sources other than from environmental frequencies, such as harmonics caused by power supplies. For instances, and in reference to FIG. 5, banding normalization module 502 may receive row sum data 303, and may compare each row sum value associated with low exposure image data 309 with a corresponding row sum value associated with high exposure image data 307 (e.g., at a common pixel column and pixel row). In some examples, to perform the comparison, banding normalization module 502 may determine a ratio between each row sum value associated with low exposure image data 309 and a corresponding row sum value associated with high exposure image data 307. To determine each ratio, banding normalization module 502 may divide the row sum values corresponding to low exposure image data 309 by the row sum values corresponding to high exposure image data 307. Banding detection engine 304 may generate a row sum ratio vector (e.g., $RATIO_R$[partition][row]) identifying and characterizing the determined ratios.

By way of example, row sum data 303 may identify and characterize row sum values for the three color channels of a low exposure image data 309, each of which may be represented by a vector, such as respective ones of vectors $SUM_R$ [8][1080] 450, $SUM_G$[8][1080] 460, and $SUM_B$ [8][1080] 470 of FIG. 4A (e.g., assuming 8 partitions and 1080 pixel columns). Further, and by way of example, row sum data 303 may also identify and characterize row sum values for the three color channels of a high exposure image 307, each of which may be represented by a vector, such as vectors $SUM_R$ [8][1080] 480, $SUM_G$[8][1080] 484, and $SUM_B$ [8][1080] 486 of FIG. 4B (e.g., also assuming 8 partitions and 1080 pixel columns). To determine ratios for the red channel, banding detection engine 304 may divide each element of vector $SUM_R$ [8][1080] 450, which identifies row sum values for the red channel of the low exposure image, by the corresponding element in $SUM_R$ [8][1080] 480, which identifies row sum values for the red channel of the high exposure image.

For example, to generate a ratio for the first partition of the high and low exposure images, first row, banding detection engine 304 may divide $SUM_R$ [0][0] 450 by $SUM_R$ [0][0] 480. The result may be stored in an element in a row sum ratio vector at a location corresponding to a same partition and pixel row (e.g., $RATIO_R$[0][0]). Similarly, banding detection engine 304 may generate ratios for the each of remaining row sum values for the red channel of the high and low exposure images, and may perform similar operations to generate ratios for the green and blue channels of the high and low exposure images.

In an example, row sum data 303 may include row sum values for additional exposure images characterized by various exposure times, such as a medium exposure image, or additional ones of a low or high exposure image. Banding normalization module 502 may, for instance, process row sum data 303 to identify the row sum values that correspond to the exposure image characterized by a maximum of the various exposure times (e.g., the row sum values corresponding to high exposure image data 307). Further, banding normalization module 502 may perform any of the exemplary processes described herein, to determine a ratio between row sum values corresponding to each of the exposure images and the row sum values corresponding to the exposure image characterized by the maximum exposure time (e.g., high exposure image data 307). Banding detection engine 304 may generate an additional row sum ratio vector identifying and characterizing the determined ratios between row sum values for each of the additional exposure images and the exposure image characterized by the maximum exposure time, and store each additional row sum ratio vector, such as in local database 510. In some examples, banding detection engine 304 normalizes the exposure image characterized by the maximum exposure time (e.g., high exposure image data 307), which may result in unity (e.g., banding detection engine 304 may, for each row of each partition, divide $SUM_R$ [partition][row] 480 for the red channel of high exposure image data 307 by itself (e.g., $SUM_R$ [partition][row] 480 for the red channel of high exposure image data 307), resulting in unity).

In some examples, banding normalization module 502 may associate a time (e.g., a timestamp) with the generated ratios (e.g., with each element of the row sum ratio vector). For example, banding normalization module 502 may receive timestamp data 537 from a timer 520. Timer 520 may be a hardware timer, for example, and may be synchronized (e.g., aligned) to a start-of-frame signal 515. Start-of-frame signal 515 may indicate a reference time for the start of the corresponding image (e.g., as identified by low exposure image data 309 or high exposure image data 307). The start-of-frame signal 515 may be received, for example, from image sensor 305 (not shown in FIG. 4). Based on timestamp data 537, banding normalization module 502 may determine an exposure time of each pixel row of row sum data 303.

Further, banding normalization module 502 may determine, for each row of each of the color channels, a filtered row value based on the generated ratios for the corresponding row in all partitions of the corresponding channel. For example, assume banding normalization module 502 generated row sum ratio vectors $RATIO_R$, $RATIO_G$, and $RATIO_B$ based on row sum values for a red, a green, and a blue channel, respectively. For the red channel, for example, banding normalization module 502 may determine a filtered row value for row zero based on partition-specific ratios for row zero, in this example, ratio vector elements $RATIO_R$[0][0], $RATIO_R$[1][0], $RATIO_R$[2][0], $RATIO_R$[3][0], $RATIO_R$[4][0], $RATIO_R$[5][0], $RATIO_R$[6][0], and $RATIO_B$[7][0], assuming eight partitions. Similarly, banding normalization module 502 may determine filtered row values for each of the remaining rows (e.g., rows 1-1079) for the red channel, and similarly determine filtered row values for each row of the green and blue channels. In some examples, banding normalization module 502 determines the filtered row values by averaging the corresponding row-specific ratios across the partitions (e.g., an average of $RATIO_R$[0][0], $RATIO_R[1][0]$, $RATIO_R[2][0]$, $RATIO_R[3][0]$, $RATIO_R[4][0]$, $RATIO_R[5][0]$, $RATIO_R[6][0]$, and $RATIO_B[7][0]$). Banding normalization module 502 may generate vectors identifying and characterizing the filtered row values. For example, banding normalization module 502 may generate a vector $FILT_R[0, \ldots 1079]$ for the red channel, a vector $FILT_G[0, \ldots 1079]$ for the green channel, and a vector $FILT_B[0, \ldots 1079]$ for the blue channel, where each vector includes a filtered row value for each row, in this example, for each of 1080 rows (i.e., rows zero to 1079).

In some examples, banding normalization module 502 filters out (e.g., ignores) one of more elements of invalid data, e.g., "holes," in the filtered row values. In some examples, banding normalization module 502 determines whether a pixel is darker than a first threshold, or brighter than a second threshold, when determining the filtered row values. For example, if pixel values vary from 0 to 255, the first threshold may be set at pixel value of 4, and the second threshold may be set at a pixel value of 235. If a pixel value is less than 10, or greater than 225, banding normalization module 502 ignores the partition when determining the filtered row value that includes that pixel. For example, if the pixel was located in row zero of partition three of eight partitions, rather than determining a filtered row value for row zero based on eight partitions, banding normalization module 502 determines a filtered row value for row zero based on the remaining seven partitions, i.e., partitions one through seven.

In some examples, and for filtered row values that are identified as invalid, e.g., and represent holes, banding normalization module 502 may replace the invalid filtered row value based a composite value determined based on neighboring filtered row values, such as by implementing linear interpolation techniques. For example, if the filtered row value identified at $FILT_R[100]$ is determined to be invalid, banding normalization module 402 may replace its value by the average of $FILT_R[99]$ and $FILT_R[101]$ (e.g., assuming $FILT_R[99]$ and $FILT_R[101]$ are not themselves invalid).

Banding normalization module 502 may generate banding normalized data 530 identifying and characterizing the filtered row values. In some examples, banding normalization module 502 stores banding normalized data 530 in a non-transitory machine-readable storage medium, such as in local database 510. For example, banding normalization module 502 may store banding normalized data 530 identifying and characterizing the filtered row values for multiple frames (i.e., each frame comprising images captured with varying exposure times) taken over a period of time in local database 510.

Spectrum analysis module 504 may determine a frequency domain representation of banding normalized data 530. Spectrum analysis module 504 may obtain banding normalized data 530 from banding normalization module 502, for example, in real-time, or may obtain banding normalized data 530 from local database 510, which may identify and characterize filtered row values for previous frames.

To determine the frequency representation of banding normalized data 530, spectrum analysis module 504 may apply a fast Fourier transform (FFT) algorithm to portions of banding normalized data 530 to generate a discrete Fourier transform (DFT) of the banding normalized data 530, for each channel (e.g., $FILT_R$ for red channel, $FILT_G$ for green channel, and $FILT_R$ for blue channel). Based on the frequency domain representation, spectrum analysis module 504 may determine the peak frequency and the phase of the peak frequency. Spectrum analysis module 504 may generate frequency representation data 534 identifying and characterizing one or more portions of the determined frequency representation, such as the peak frequency and the phase of the peak frequency. Spectrum analysis module 504 may also generates frequency representation data 534 for each color channel (e.g., red, green, and blue).

In some examples, to generate frequency representation data 534, spectrum analysis module 504 may apply one or more machine learning processes, such as but not limited to an artificial neural network model (e.g., long short-term memory (LSTM) model), or a recurrent neural network (RNN) model, to portions of banding normalized data 530. The machine learning models may be trained with supervised, or unsupervised, data, for example, and may be implemented by imaging device 301 in conjunction with one or more computing systems of a distributed or cloud-based network (e.g., each device in the distributed or cloud-based network may represent a node of the artificial neural network model).

Gain synthesis module 506 may receive frequency representation data 534, e.g., as an input from spectrum analysis module 504, and may generate banding correction data 307 that identifies and characterizes a banding correction gain (e.g., a banding error) based on the frequency representation data 534 for each of the color channels. The banding correction gain may, for example, be used to correct banding errors in a current, or future, frame.

For example, gain synthesis module 506 may parameterize the banding correction gain as a trigonometric function, such as a sine or cosine function, having operands that include, but are not limited to, a peak frequency and a phase of the peak frequency identified by frequency representation data 534 (e.g., in the real or complex plane). For example, gain synthesis module 506 may determine an amplitude of the parameterized trigonometric function based on the exposure time of the associated low exposure image, e.g. of low exposure image data 309, as computed or determined using any of the processes described herein. For example, if the peak frequency and phase of the peak frequency are based on ratios that were determined based on row sum values for a low exposure image (e.g., as specified by low exposure image data 309) and a high exposure image (e.g., as specified by high exposure image data 307), gain synthesis module 506 may determine the amplitude based on the exposure time of the low exposure image. As another example, if the peak frequency and phase of the peak frequency reflect ratios that were determined based on row sum values for a medium exposure image and a high exposure image, as described herein, gain synthesis module 506 may determine the amplitude based on the exposure time of the medium exposure image.

Gain synthesis module 506 may then apply inverse division by a constant to the function (e.g., sine function) generated. The constant may include a predefined value, such as one input by a user via input unit 314 and provided to gain synthesis module 506 by processor 342. Gain synthesis module 506 may generate banding correction data 307 identifying the result of the inverse division for each color channel (e.g., red, green, and blue).

In some examples, gain synthesis module 506 applies one or more machine learning processes, such as but not limited to an artificial neural network model (e.g., a long short-term memory (LSTM) model), or a recurrent neural network (RNN) model, to portions of frequency representation data 534 to generate banding correction data 307. The one or more machine learning processes may, for example, be implemented by imaging device 301 in conjunction with one or more computing systems of a distributed or cloud-based network (e.g., each device in the distributed or cloud-based network may represent a node of the artificial neural network model).

Referring back to FIG. 3, banding correction engine 306 may receive banding correction data 307 from banding detection engine 304, and based on an application of one or more flicker correction algorithms to banding correction data 307, banding correction engine 306 may generate row gain data 311 that identifies and characterizes row gain values. For example, row gain data 311 may identify a row gain vector for each color channel (e.g., red, green, and blue), where each row gain vector includes a gain to be applied to a corresponding pixel (e.g., a pixel located at a particular pixel column and pixel row) of low exposure image data 309, of high exposure image data 307, or of each of low exposure image data 309 and high exposure image data 307.

Row gain application engine 308 may receive row gain data 311 from banding correction engine 306, and may apply row gain data 311 to low exposure image data 309 and/or to high exposure image data 307. For example, row gain data 311 may specify row gain values for the low exposure image identified by low exposure image data 309. Row gain application engine 308 may receive low exposure image data 309 from image sensor 305, and, for each pixel, apply a corresponding row gain value identified by row gain data 311. Row gain application engine 308 may generate corrected low exposure image data 313, which identifies and characterizes the corrected pixel values for the low exposure image. In some examples, based on an application of similar exemplary processes to high exposure image data 307, row gain application engine 308 may also generate corrected high exposure image data 311, which identifies and characterizes the corrected pixel values for the high exposure image associated with high exposure image data 307.

HDR image merging device 320 may receive corrected high exposure image data 311 and corrected low exposure image data 313, and merge them to generate image frame data 323, which identifies and characterizes the merged, and corrected, image. HDR image merging device 320 may store image frame data 323 in within the structured or unstructured data records of database 321. The image may then be displayed, such as on display unit 316. For example, processor 342 may read image frame data 323 from database 321, and provide it to display unit 316 for display to a corresponding user.

As described herein, the corrected image data (e.g., image frame data 123) reflects a correction of banding (e.g., flicker) errors in a newly or previously captured image. Further, the exemplary banding correction processes, when implemented by imaging device 301, may reduce visible defects that become evident upon presentation of an uncorrected image, e.g., via display unit 316.

Figure 6:
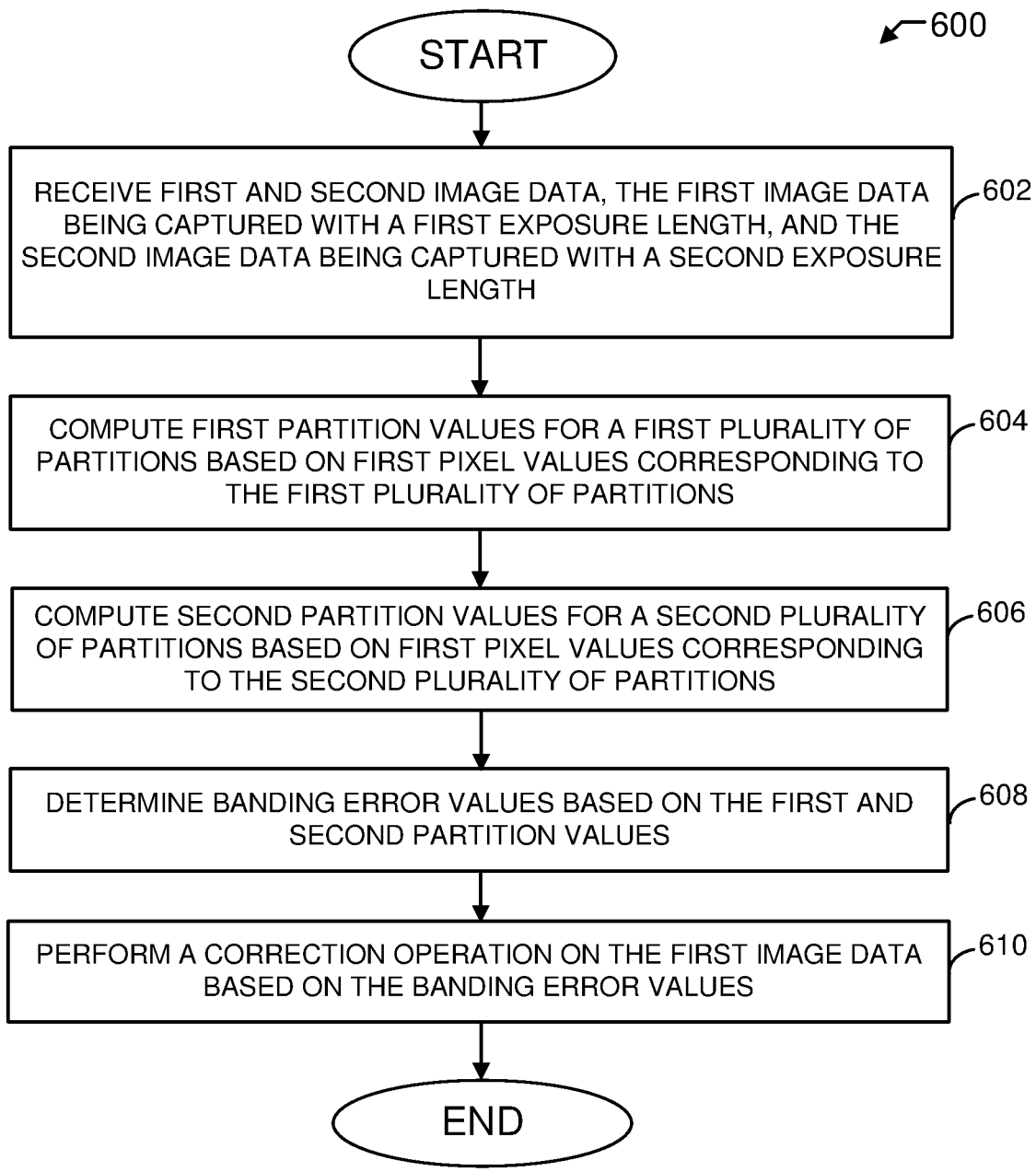
FIG. 6 is a flowchart of an exemplary process for performing image banding correction, according to some examples.

FIG. 6 is a flowchart of an example process 600 for performing image banding correction, in accordance with one implementation. Process 600 may be performed by one or more processors executing instructions locally at an image capture device, such as processor 342 of imaging device 301 of FIG. 3. Accordingly, the various operations of process 600 may be represented by executable instructions held in storage media of one or more computing platforms, such as storage media 330 of imaging device 301.

Referring to block 602, imaging device 301 may receive first and second image data, where the first image data is captured with a first exposure parameter, and the second image data is captured with a second exposure parameter. Each of the first and second exposure parameters may, for example, include a respective exposure length (e.g., as established by a difference between respective exposure start and finish time).

In some examples, imaging device 301 may capture a first image of a first object at a first exposure time from an image sensor, such as image sensor 105 of FIG. 1, and may also capture a second image of the first object at a second exposure time from the image sensor. Each of the first image and second image may include a plurality of pixel rows. For example, as described above with respect to FIG. 3, image sensor 305 may capture a high exposure image, identified by high exposure image data 307, and a low exposure image, identified by low exposure image data 309.

Additionally, in some examples, imaging device 301 may also capture image data that includes a plurality of images of the same subject matter, e.g., a frame of images. Each image may include a plurality of pixels, and imaging device 301 may capture each of the plurality of images at a different exposure time. For example, image sensor 105 of imaging device 301 may perform one or more HDR processes and capture a low exposure image, a medium exposure image, and a high exposure image of a same scene. A medium exposure image may, for example, represent an image captured with an exposure length greater than the exposure length of the low exposure image, but less than the exposure length of the high exposure image.

At block 604, imaging device 301 may compute first partition values for a first plurality of partitions. In some examples, the first partition values may be computed based on first pixel values corresponding to the first plurality of partitions, and imaging device 301 may partition each of the first image and the second image into a plurality of partitions, where each partition comprises a portion of each of the respective rows of pixels of the images. For instance, as described above, row sum collection engine 302 may receive high exposure image data 307 and low exposure image data 309. Row sum collection engine 302 may partition each of high exposure image data 307 and low exposure image data 309 into a number of columns (e.g., eight columns). Each partition may include, for example, an equal number of pixel columns, and the same number of pixel rows. For each row of pixels of each of the first plurality of partitions, imaging device 301 may compute a row sum value as described herein, and in some examples, the first partition values may include the computed row sum values.

At block 606, imaging device 301 may compute second partition values for a second plurality of partitions. The second partition values may be computed based on first pixel values corresponding to the second plurality of partitions. For example, for each row of pixels of each of the second plurality of partitions, imaging device 301 may compute a row sum value.

At block 608, imaging device 301 may determine banding error values based on the first and second partition values. For example, as described above, banding detection engine 304 may generate, based on a frequency domain representation of the row pixel values, banding correction data 307 that identifies and characterizes banding errors in the row sum values.

At block 610, imaging device 301 may perform a correction operation on the first image data based on the banding error values. For example, row gain application engine 308 of imaging device 301 may apply a gain to the first image data to correct for, account for, or reduce, the banding errors, and imaging device 301 may apply a gain to at least one of the first image and the second image to correct for, account for, or reduce the banding errors. In some examples, and as described above, banding correction engine 306 may receive banding correction data 307 from banding detection engine 304 and generate row gain data 311 that identifies and characterizes row gain values. Row gain application engine 308 may apply the row gain values to low exposure image data 309 and/or high exposure image data 307 to correct banding errors. Exemplary process 600 is then completed at block 610.

Figure 7:
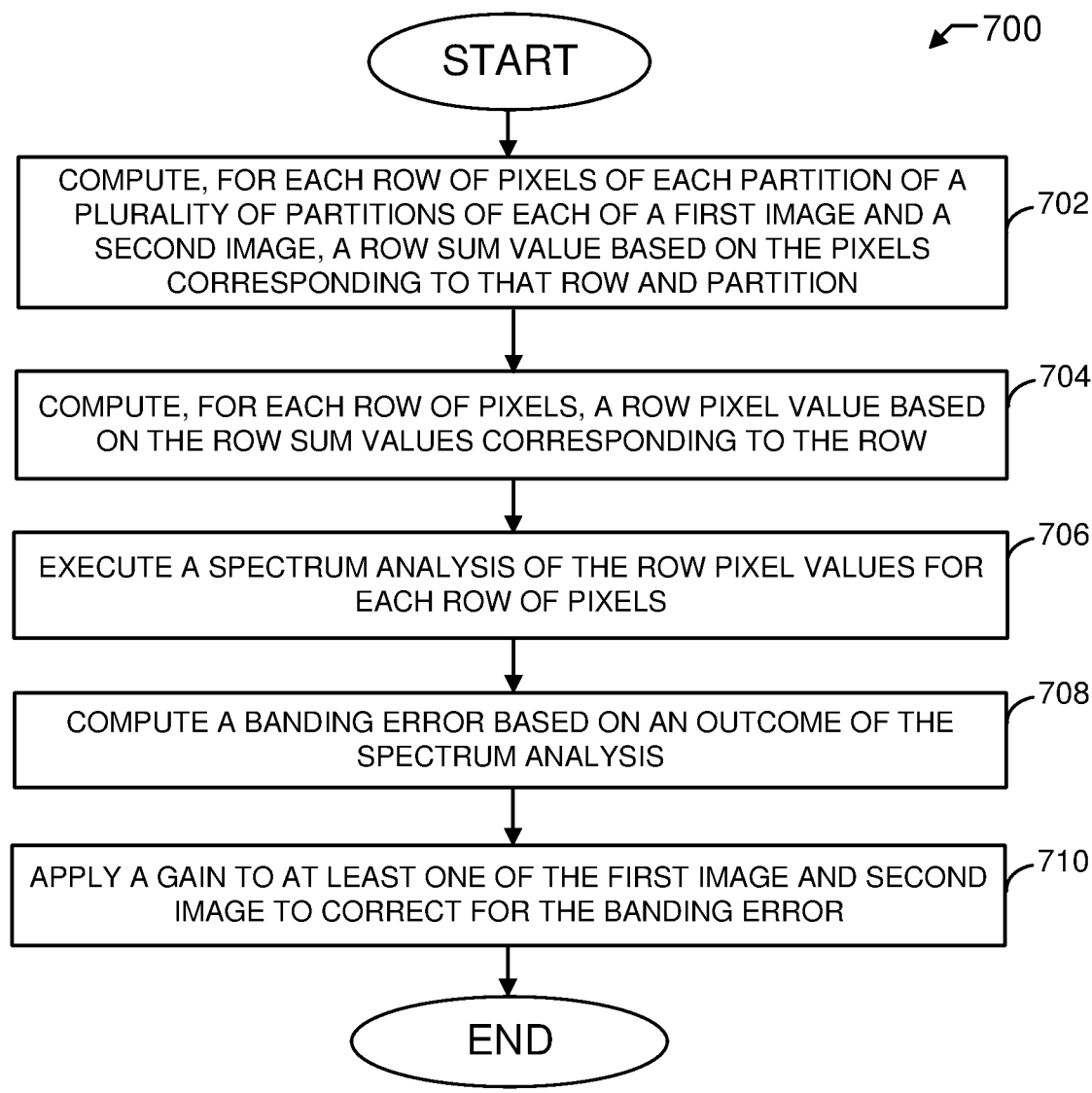
FIGS. 7, 8, and 9 are flowcharts of exemplary processes for computing banding errors and performing automatic banding correction in multiple exposure images, according to some examples.
Figure 8:
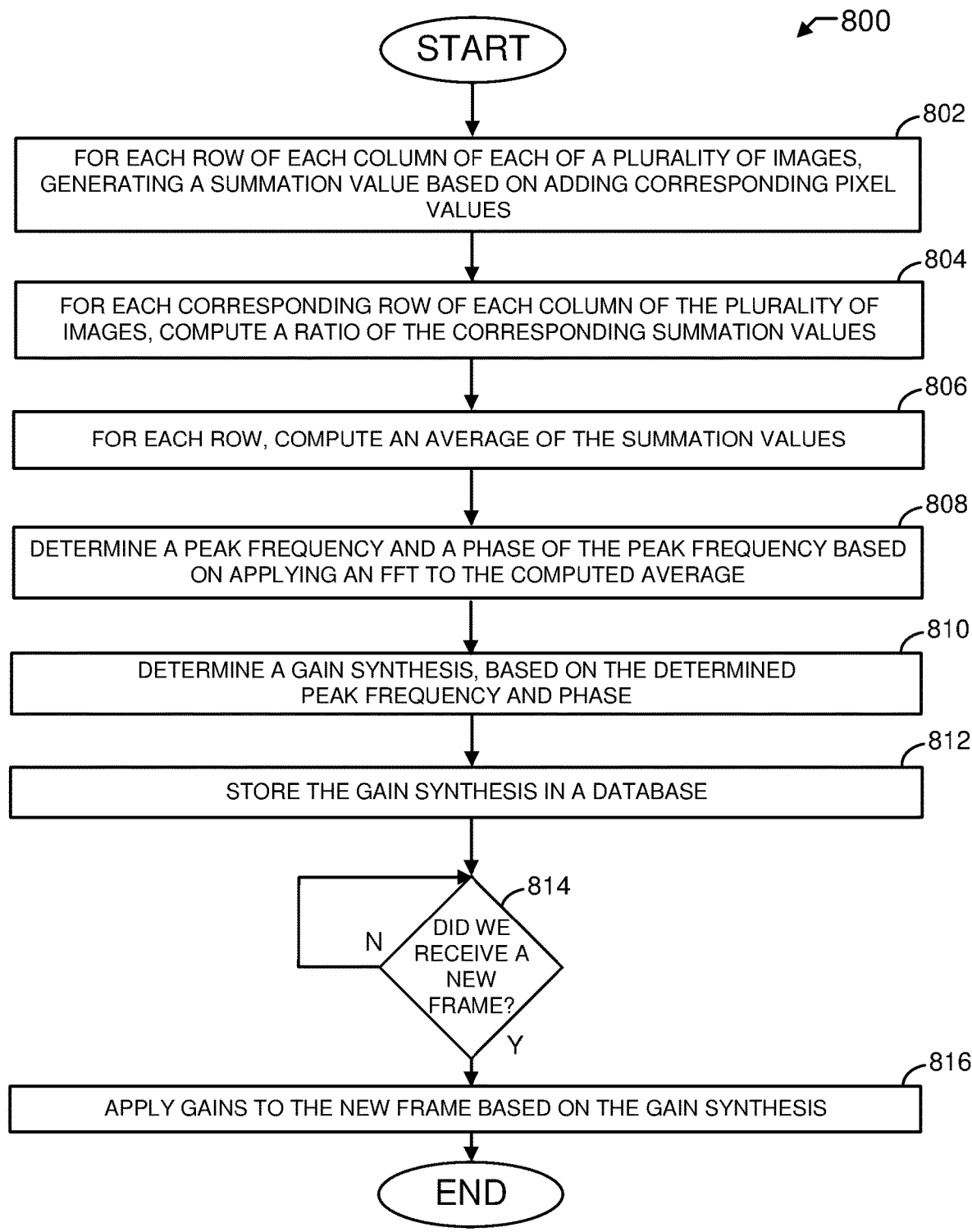
Figure 9:
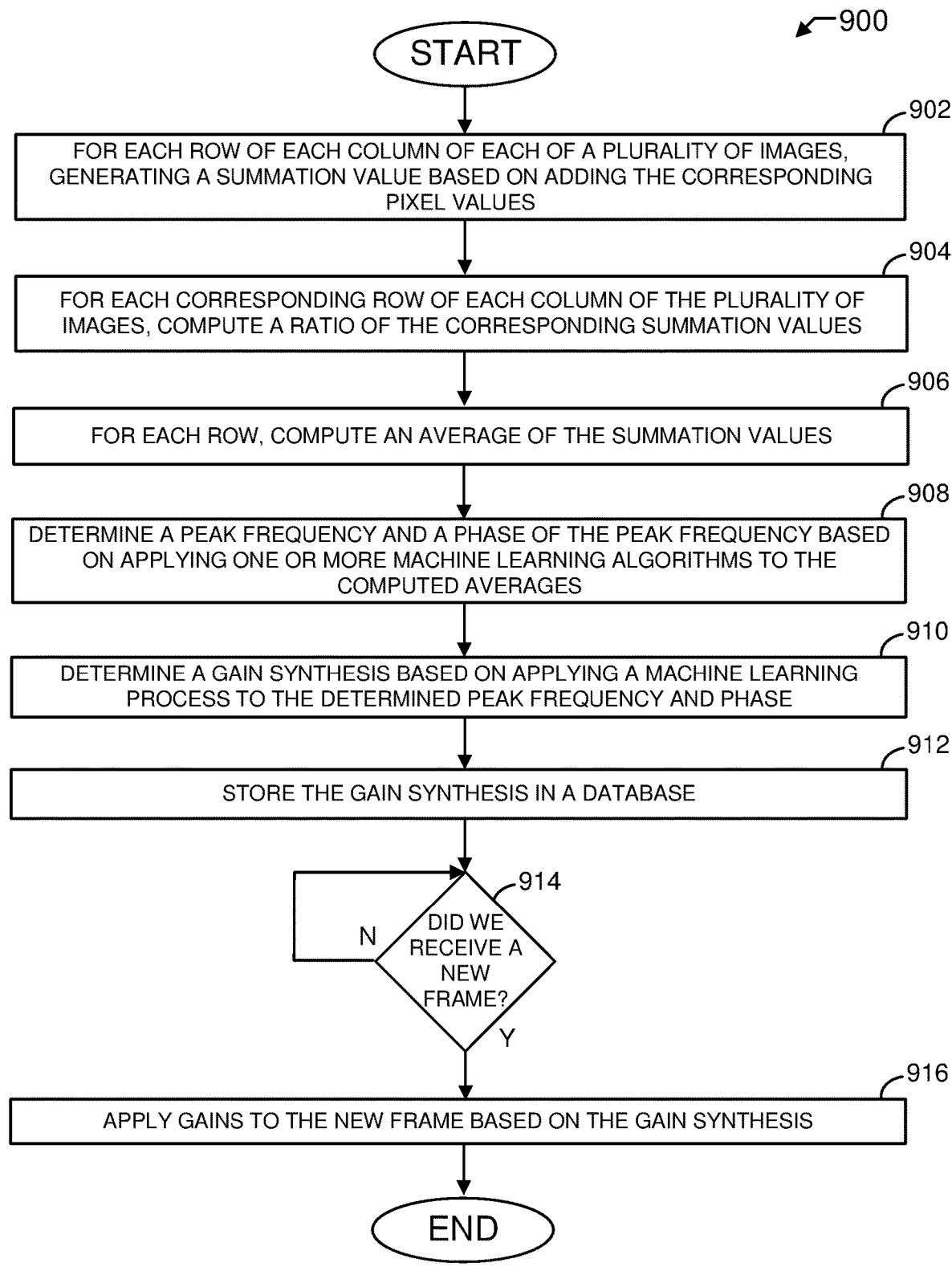

FIGS. 7, 8, and 9 are flowcharts of example processes for computing banding error values and performing correction operations to correct image data, such as to correct for banding errors in images. For example, the exemplary processes of FIGS. 7, 8, and 9 may be performed by one or more processors executing instructions locally at an image capture device, such as processor 342 of imaging device 301, e.g., during blocks 608 and 612 of example process 600.

FIG. 7 is a flowchart of an example process 700 for computing banding error values and performing banding correction in multiple exposure images, such as in HDR images, in accordance with one implementation. Process 700 may be performed by one or more processors executing instructions locally at an image capture device, such as processor 342 of imaging device 301 of FIG. 3. Accordingly, the various operations of process 700 may be represented by executable instructions held in storage media of one or more computing platforms, such as storage media 330 of imaging device 301.

At block 702, imaging device 301 may compute, for each row of pixels of each partition of a plurality of partitions, for each of a first image and a second image, a row sum value based on the pixels corresponding to each row and partition of each image. For example, the first image and the second image may be high exposure image data 307 and low exposure image data 309. As described above, row sum collection engine 302 may add the pixel values at each row of each partition, and generate a row sum value for that row and partition for each image.

At block 704, imaging device 301 may compute, for each row of pixels, a row pixel value based on the row sum values corresponding to each row. For example, and as described above, banding detection engine 304 may determine a ratio between each of the row sum values for the low exposure image and corresponding row sum values for the high exposure image. Banding detection engine 304 may then determine filtered row values for each row of each channel based on averaging the ratios corresponding to each row.

At block 706, image device may execute a spectrum analysis of the determine row pixel values. For example, and as described above, banding detection engine 304 of imaging device 301 may determine a frequency domain representation of the row pixel values. In some examples, banding detection engine 304 applies a fast Fourier transform (FFT) algorithm to portions of the row pixel values to generate a discrete Fourier transform (DFT) of the row pixel values, for each channel. For example, as described above, banding detection engine 304 may apply the FFT algorithm to portions of banding normalized data 530 to generate the DFT of the banding normalized data 530, for each color channel. Based on the frequency domain representation, banding detection engine 304 may determine the peak frequency and the phase of the peak frequency.

At block 708, imaging device 301 computes a banding error based on an outcome of the spectrum analysis. For example, as described above, banding detection engine 304 may generate, based on the frequency domain representation, banding correction data 307 that identifies and characterizes banding errors in the row sum values. For example, banding detection engine 304 may parameterize a trigonometric function, such as a sine or cosine function, having as operands a peak frequency and a phase of the peak frequency identified by the frequency domain representation data. Banding detection engine 304 may then apply inverse division by a constant to the parameterized function (e.g., the sine or cosine function), and based on an outcome the inverse division, banding detection engine 304 may generate banding correction data 307 that identifies the banding errors.

At block 710, imaging device 1012 may apply a gain to at least one of the first image and the second image to correct for, account for, or reduce the banding errors. For example, and as described above, banding correction engine 306 may receive banding correction data 307 from banding detection engine 304 and generate row gain data 311 that identifies and characterizes row gain values. Row gain application engine 308 may apply the row gain values to low exposure image data 109 and/or high exposure image data 107. Exemplary process 500 is then completed at block 514.

FIG. 8 is a flowchart of example process 800 for computing banding error values and performing banding correction in multiple exposure images, such as in HDR images, in accordance with one implementation. Process 800 may be performed by one or more processors executing instructions locally at an image capture device, such as processors 310 of imaging device 301 of FIG. 3. Accordingly, the various operations of process 800 may be represented by executable instructions held in storage media of one or more computing platforms, such as storage media 330 of imaging device 301.

Beginning at block 802, for each row of each column of each of a plurality of images, imaging device 301 may generate a summation value based on a summation of the pixel values within a corresponding row and column of each image. For example, as described above, for each color channel of each of a plurality of images, row sum collection engine 302 may add the pixel values at each row of each image partition, and generate a row sum value for that row and partition. FIGS. 4A and 4B, for example, illustrate the computing of row sum values for each row of each of three channels (i.e., red, green, and blue channels) of a lower exposure image, and a high exposure image, respectively. As described above, row sum collection engine 302 may generate, for the low exposure image, a vector $SUM_R$ [partition, row] 450 identifying the row sum values for the red channel, a $SUM_G$ [partition, row] 460 identifying the row sum values for the green channel, and a $SUM_B$ [partition, row] 470 identifying the row sum values for the blue channel. Similarly, row sum collection engine 302 may generate, for the high exposure image, a vector $SUM_R$ [partition, row] 480 identifying the row sum values for the red channel, a $SUM_G$ [partition, row] 484 identifying the row sum values for the green channel, and a $SUM_B$ [partition, row] 486 identifying the row sum values for the blue channel.

At block 804, for each of the plurality of images, imaging device 301 may compute ratios based on the summation values. For example, and as described above, banding detection engine 304 may determine a ratio between each of the row sum values for each lower exposure image and corresponding row sum values for a highest exposure image. For example, the row sum values for each lower exposure image (or for each of the low exposure image and the medium exposure image, as described herein), may be divided by the row sum values for the high exposure image. Banding detection engine 304 may generate vectors identifying the ratios using any of the processes described herein. For example, for each low exposure image, banding detection engine may generate a vector RATIO$_R$[partition][row] identifying the ratios for the red channel, a vector RATIO$_G$[partition][row] identifying the ratios for the green channel, and a vector RATIO$_B$[partition][row] identifying the ratios for the blue channel.

At block 806, for each row of each partition for each channel of each lower exposure image, imaging device 301 may compute an average of the summation values. For example, as described above, banding detection engine 304 may determine, for each row of each channel, a filtered row value based on the generated ratios for the corresponding row in all partitions of each corresponding channel. For each red channel, for example, banding detection engine 304 may determine a filtered row value for row zero based on RATIO$_R$[0][0], RATIO$_R$[1][0], RATIO$_R$[2][0], RATIO$_R$[3][0], RATIO$_R$[4][0], RATIO$_R$[5][0], RATIO$_R$[6][0], and RATIO$_B$[7][0], assuming the lower exposure images were partitioned into eight partitions. Similarly, banding detection engine 304 may determine filtered row values for each of the remaining rows for the red channel, and similarly determine filtered row values for each row of the green and blue channels, for each lower exposure image.

At block 808, imaging device 301 may determine a peak frequency and a phase of the peak frequency based on an application of a fast Fourier transform (FFT) to the computed averages. For example, as described above, banding detection engine 304 may apply an FFT algorithm to portions of banding normalized data 530 to generate a discrete Fourier transform (DFT) of the banding normalized data 530 for each of the color channels. Based on the DFT, banding detection engine 304 may determine the peak frequency and the phase of the peak frequency.

At block 810, imaging device 301 may determine a gain synthesis based on the peak frequency and phase of the peak frequency. To determine the gain synthesis, and as described above, banding detection engine 304 may parameterize a trigonometric function, such as a sine or a cosine function, having as operands a peak frequency and a phase of the peak frequency identified by frequency representation data 534. Banding detection engine 304 may also determine an amplitude of the function based on the exposure time of the associated lower exposure image, e.g., using any of the exemplary processes described herein. Banding detection engine 304 may, for example, perform operations that determine the gain synthesis based on an application, to the parameterized function, of an inverse division by a constant. For example, banding detection engine 304 generates banding correction data 307 identifying the determined gain synthesis for each channel (e.g., red, green, and blue).

At block 812, imaging device 301 may store the gain synthesis in a database maintained within a non-transitory, machine-readable storage medium, such as database 321 of storage media 330. For example, as described above, processor 342 may receive banding correction data 307 from banding detection engine 304, and store banding correction data 307 in database 321 of storage media 330.

At block 814, imaging device 301 determines whether a new frame of images (e.g., new HDR frame comprising multiple images captured with various exposure times) has been received from image sensor 305. If imaging device were to determine in block 814 that a new frame has not yet been received (e.g., block 814; NO), exemplary process 800 may repeat block 814 and await receipt of the new frame of images. Alternatively, if imaging device 301 were to receive a new frame of images (e.g., block 814; YES), exemplary process 800 passes to block 816.

At block 816, imaging device 301 may apply pixel gains to the new frame based on the determined gain synthesis. For example, as described above, banding correction engine 306 generates row gain data 311 that identifies and characterizes row gain values based on banding correction data 307. Banding correction engine 306 may apply one or more flicker correction algorithms to banding correction data 307 to generate row gain data 311, and row gain application engine 308 may apply row gain data 311 to low exposure image data 309 and/or high exposure image data 307. Exemplary process 800 is then completed at block 816.

FIG. 9 is a flowchart of example process 900 for computing banding error values and performing banding correction in multiple exposure images, such as in HDR images, in accordance with one implementation. Process 900 may be performed by one or more processors executing instructions locally at an image capture device, such as processors 310 of imaging device 301 of FIG. 3. Accordingly, the various operations of process 900 may be represented by executable instructions held in storage media of one or more computing platforms, such as storage media 330 of imaging device 301.

Beginning at block 902, for each row of each column of each image, imaging device 301 may generate a summation value based on a summation the pixel values within the corresponding row and column. For example, as described above, for each channel of each of a plurality of images, row sum collection engine 302 may add the pixel values at each row of each image partition, and generate a row sum value for that row and partition. FIGS. 4A and 4B, for example, illustrate the computing of row sum values for each row of each of three channels (i.e., red, green, and blue channels) of a low exposure image, and a high exposure image, respectively.

At block 904, for each of the plurality of images, imaging device 301 may compute ratios based on the summation values. For example, and as described above, banding detection engine 304 may determine a ratio between each of the row sum values for each lower exposure image and corresponding row sum values for a highest exposure image. For example, the row sum values for each lower exposure image, in this example, for each of the low exposure image and the medium exposure image, may be divided by the row sum values for the high exposure image. Banding detection engine 304 may generate vectors identifying the rations. For example, for each low exposure image, banding detection engine may generate a vector RATIO$_R$[partition][row] identifying the ratios for the red channel, a vector RATIO$_G$[partition][row] identifying the ratios for the green channel, and a vector RATIO$_B$[partition][row] identifying the ratios for the blue channel.

At block 906, for each row of each partition for each channel of each lower exposure image, imaging device 301 may compute an average of the summation values. For example, as described above, banding detection engine 304 may determine, for each row of each color channel, a filtered row value based on the generated ratios for the corresponding row in all partitions of each corresponding color channel. For each red channel, for example, banding detection engine 304 may determine a filtered row value for row zero based on RATIO$_R$[0][0], RATIO$_R$[1][0], RATIO$_{R[2][0]}$, RATIO$_R$[3][0], RATIO$_R$[4][0], RATIO$_R$[5][0], RATIO$_R$[6][0], and RATIO$_B$[7][0], assuming the lower exposure images were partitioned into eight partitions. Similarly, banding detection engine 304 may determine filtered row values for each of the remaining rows for the red channel, and similarly determine filtered row values for each row of the green and blue channels, for each lower exposure image.

At block 908, imaging device 301 may determine a peak frequency and a phase of the peak frequency based on an execution of one or more machine learning algorithms, e.g., either alone or in conjunction with one or more computing systems or devices within a distributed or cloud-based computing network. The one or more machine learning algorithms may include, but are not limited to, a long term-short memory (LSTM) model, or a recurrent neural network (RNN) model, and to generate frequency representation data 534 identifying a peak frequency and phase of the peak frequency, banding detection engine 304 may apply the one or more machine learning algorithms to portions of banding normalized data 530 (e.g., either alone or in conjunction with the one or more computing systems or devices within the distributed or cloud-based computing network).

At block 910, imaging device 301 may determine a gain synthesis based on an application of one or more machine learning processes to the peak frequency and phase of the peak frequency. For example, as described above, to determine the gain synthesis, banding detection engine 304 applies one or more machine learning processes (e.g., one or more machine learning algorithms), such as but not limited to the LSTM model or the RNN model, to the peak frequency and phase of the peak frequency to generate banding correction data 307 for each color channel (e.g., red channel, green channel, and blue channel).

At block 912, imaging device 301 may store the gain synthesis in a database located in a non-transitory, machine-readable storage medium, such as database 321 of storage media 330. For example, as described above, processor 342 may receive banding correction data 307 from banding detection engine 304, and store banding correction data 307 in database 321 of storage media 330.

At block 914, imaging device 301 may determine a new frame (e.g., new HDR frame comprising multiple images captured with various exposure times) has been received from image sensor 305. If imaging device were to determine in block 914 that a new frame has not yet been received (e.g., block 914; NO), exemplary process 900 may repeat block 914 and await receipt of the new frame of images. Alternatively, if imaging device 301 were to receive a new frame of images (e.g., block 914; YES), exemplary process 900 passes to block 916.

At block 916, imaging device 301 may apply pixel gains to the new frame based on the determined gain synthesis. For example, as described above, banding correction engine 306 may generate row gain data 311 that identifies and characterizes row gain values based on banding correction data 307. For example, banding correction engine 306 may apply one or more flicker correction algorithms to banding correction data 307 to generate row gain data 311. Row gain application engine 308 may, for example, apply row gain data 311 to low exposure image data 109 and/or high exposure image data 107. Exemplary process 900 is then completed at block 714.

The methods, systems, and devices described herein may be at least partially embodied in the form of computer-implemented processes and apparatus for practicing the disclosed processes. The disclosed methods may also be at least partially embodied in the form of tangible, non-transitory machine-readable storage media encoded with computer program code. The media may include, for example, random access memories (RAMs), read-only memories (ROMs), compact disc (CD)-ROMs, digital versatile disc (DVD)-ROMs, "BLUE-RAY DISC"™ (BD)-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods. In other instances, the methods may at least be embodied within sensor-based circuitry and logic.

The subject matter has been described in terms of exemplary embodiments. Because they are only examples, the claimed inventions are not limited to these embodiments. Changes and modifications may be made without departing the spirit of the claimed subject matter. It is intended that the claims cover such changes and modifications.

We claim:

1. A method for performing image banding correction, comprising:

receiving, by one or more processors, first and second image data, the first image data being captured with a first exposure parameter, and the second image data being captured with a second exposure parameter, the second exposure parameter being different than the first exposure parameter;

computing, by the one or more processors, first partition values for a first plurality of partitions of the first image data, and computing, by the one or more processors, second partition values for a second plurality of partitions of the second image data;

comparing, by the one or more processors, the first partition values for each of the first plurality of partitions with corresponding ones of the second partition values for each of the second plurality of partition;

determining, by the one or more processors, banding error values based on the comparison; and performing, by the one or more processors, a correction operation on the first image data based on the banding error values.

2. The method of claim 1, wherein the first exposure parameter comprises a first exposure length, and wherein the second exposure parameter comprises a second exposure length, the second exposure length exceeding the first exposure length.

3. The method of claim 1, wherein computing the first partition values comprises generating first row sum values for each row of the first plurality of partitions, and wherein computing the second partition values comprises generating second row sum values for each row of the second plurality of partitions, and wherein;

determining the banding error values comprises:

determining an element of a row sum ratio vector for each row of each of the first plurality of partition, wherein each element of the row sum ratio vector is determined based on the first row sum value of a corresponding row of the first plurality of partitions and the second row sum value of a corresponding row of the second plurality of partitions; and determining, for each row of the first plurality of partitions, a filtered row value based on the elements of the row sum ratio vector corresponding to each row of each of the first plurality of partitions, and computing the banding error values is based on the filtered row values.

4. The method of claim 1, wherein performing the correction operation comprises generating corrected first image data identifying a corrected first image, and the method further comprises:

merging the corrected first image data and the second image data; and generating third image data based on the merger of the corrected first image data and the second image data.

5. The method of claim 4, wherein:

each of the first image data and the second image data correspond to a respective image of a target scene;

the method further comprises displaying the third image data.

6. The method of claim 1, wherein:

computing, by the one or more processors, the first partition values comprises computing the first partition values based on first pixel values corresponding to the first plurality of partitions; and computing, by the one or more processors, the second partition values comprises computing the second partition values based on second pixel values corresponding to the second plurality of partitions.

7. The method of claim 6, wherein computing the first partition values and the second partition values comprises performing operations that down-sample each of the first partition values and the second partition values.

8. The method of claim 6, wherein:

the comparing comprises determining ratios between the first partition values for each of the first plurality of partitions with the corresponding ones of the second partition values; and computing the banding error values is based on the ratios.

9. The method of claim 8, wherein comparing each of the first partition values and the corresponding one of the second partition values comprises determining a filtered row value for each row of each of the first plurality of partitions.

10. The method of claim 8, wherein:

computing the banding error values comprises determining a frequency domain representation of the filtered row values; and computing the banding error values comprises computing the banding error values based on the frequency domain representation of the filtered row values.

11. The method of claim 1, wherein performing the correction operation comprises:

generating gain values based on the banding error values; and applying the gain values to at least one of the first and second image data.

12. The method of claim 1, wherein determining the banding error values comprises:

determining a frequency representation based on the first and second partition values;

determining a gain synthesis based on the frequency representation; and determining the banding error values based on the gain synthesis.

13. A device for performing image banding correction, comprising:

a non-transitory, machine-readable storage medium storing instructions; and at least one processor coupled to the non-transitory, machine-readable storage medium, the at least one processor being configured to execute the instructions to:

receive first and second image data, the first image data being captured with a first exposure parameter, and the second image data being captured with a second exposure parameter, the second exposure parameter being different than the first exposure parameter;

compute first partition values for a first plurality of partitions based on first pixel values corresponding to the first plurality of partitions, and computing second partition values for a second plurality of partitions based on second pixel values corresponding to the second plurality of partitions;

comparing the first partition values for each of the first plurality of partitions with corresponding ones of the second partition values for each of the second plurality of partitions;

compute banding error values based on the comparison; and perform a banding correction operation on the first image data based on the banding error values.

14. The device of claim 13, wherein the first exposure parameter comprises a first exposure length, and wherein the second exposure parameter comprises a second exposure length, the second exposure length exceeding the first exposure length.

15. The device of claim 13, wherein the at least one processor is further configured to execute the instructions to:

generate first row sum values for each row of the first plurality of partitions;

generate second row sum values for each row of the second plurality of partitions;

determine an element of a row sum ratio vector for each row of each of the first plurality of partitions, wherein each element of the row sum ratio vector is determined based on the first row sum value of a corresponding row of the first plurality of partitions; and determine, for each row of the first plurality of partitions, a filtered row value based on the elements of the row sum ratio vector corresponding to each row of each of the first plurality of partitions, and compute the banding error values based on the filtered row values.

16. The device claim 13, wherein the at least one processor is further configured to execute the instructions to:

generate corrected first image data identifying a corrected first image; and merge the corrected first image data and the second image data; and generate third image data based on the merger of the corrected first image data and the second image data.

17. The device of claim 13, wherein:

each of the first image data and the second image data correspond to a respective image of a target scene; and the at least one processor is further configured to execute the instructions to display the third image data.

18. The device claim 13, wherein the at least one processor is further configured to execute the instructions to:

compute the first partition values based on first pixel values corresponding to the first plurality of partitions; and compute the second partition values based on second pixel values corresponding to the second plurality of partitions.

19. The device of claim 18, wherein the at least one processor is further configured to execute the instructions to perform operations that down-sample each of the first partition values and the second partition values.

20. The device of claim 18, wherein the at least one processor is further configured to execute the instructions to:
   determine ratios between the first partition values for each of the first plurality of partitions with the corresponding ones of the second partition values; and
   compute the banding error values based on the ratios.

21. The device of claim 20, wherein the at least one processor is further configured to execute the instructions to: determine a filtered row value for each row of each of the first plurality of partitions.

22. The device of claim 21, wherein the at least one processor is further configured to execute the instructions to:
   determine a frequency domain representation of the filtered row values; and
   compute the banding error values based on the frequency domain representation of the filtered row values.

23. The device of claim 13, wherein the at least one processor is further configured to execute the instructions to:
   generate gain values based on the banding error values; and
   apply the gain values to at least one of the first and second image data.

24. The device of claim 13, wherein the at least one processor is further configured to execute the instructions to:
   determine a frequency representation based on the first and second partition values;
   determine a gain synthesis based on the frequency representation; and
   determine the banding error values based on the gain synthesis.

25. An apparatus, comprising:
   an image sensor;
   a non-transitory, machine-readable storage medium storing instructions; and
   at least one processor coupled to the image sensor and the non-transitory, machine-readable storage medium, the at least one processor being configured to execute the instructions to:
      receive first and second image data from the image sensor, the first image data being captured with a first exposure parameter, and the second image data being captured with a second exposure parameter, the second exposure parameter being different than the first exposure parameter;
      compute first partition values for a first plurality of partitions based on first pixel values corresponding to the first plurality of partitions, and compute second partition values for a second plurality of partitions based on second pixel values corresponding to the second plurality of partitions;
      compare the first partition values for each of the first plurality of partitions with corresponding ones of the second partition values for each of the second plurality of partitions;
      compute banding error values based on the comparison; and
      perform a banding correction operation on the first image data based on the banding error values.

* * * * *